(12) United States Patent
Storisteanu

(10) Patent No.: US 7,437,667 B2
(45) Date of Patent: Oct. 14, 2008

(54) SYSTEM AND METHOD OF PROCESSING A DOCUMENT TARGETED FOR ONE SYSTEM ON ANOTHER SYSTEM

(75) Inventor: Adrian Storisteanu, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 471 days.

(21) Appl. No.: 10/756,140

(22) Filed: Jan. 13, 2004

(65) Prior Publication Data

US 2004/0261024 A1    Dec. 23, 2004

(30) Foreign Application Priority Data

Jun. 20, 2003    (CA)    ................................. 2432868

(51) Int. Cl.
*G06F 17/00*    (2006.01)
(52) U.S. Cl. ....................................... 715/255; 715/249
(58) Field of Classification Search ................. 715/536, 715/522–524, 530, 531, 255, 256, 264, 248–250; 704/2–5, 8
See application file for complete search history.

(56) References Cited

U.S. PATENT DOCUMENTS

| | | | | |
|---|---|---|---|---|
| 3,847,346 A | | 11/1974 | Dolch | 382/175 |
| 4,209,784 A | | 6/1980 | Sumner et al. | 345/168 |
| 5,321,801 A | | 6/1994 | Ando | 715/535 |
| 5,337,233 A | | 8/1994 | Hofert et al. | 715/540 |
| 5,384,700 A | | 1/1995 | Lim et al. | 715/531 |
| 5,392,390 A | * | 2/1995 | Crozier | 715/751 |
| 5,418,718 A | | 5/1995 | Lim et al. | 715/536 |
| 5,524,191 A | | 6/1996 | Storisteanu et al. | 715/531 |
| 5,793,381 A | * | 8/1998 | Edberg et al. | 345/467 |
| 5,890,179 A | | 3/1999 | Naito | 715/536 |
| 6,003,050 A | * | 12/1999 | Silver et al. | 715/536 |
| 6,049,869 A | * | 4/2000 | Pickhardt et al. | 712/300 |
| 6,055,365 A | * | 4/2000 | Tye | 716/1 |
| 6,154,748 A | * | 11/2000 | Gupta et al. | 707/102 |

(Continued)

OTHER PUBLICATIONS

Brenner, N.; "Editing APL Object with CMS XEDIT", ACM Digital Library, 1984.
IBM TDB: Breslau, F.C., et al; "File Input Protect for Half-Duplex Full-Screen Editors", vol. 39, No. 12, Dec. 1996.

*Primary Examiner*—Stephen Hong
*Assistant Examiner*—Manglesh M Patel
(74) *Attorney, Agent, or Firm*—Stephen R. Tkacs; Stephen J. Walder, Jr.; Jeffrey S. LaBaw

(57) ABSTRACT

A document processing system and method for actively processing a document targeted for one system on another system. The method of processing a document having associated field definitions targeted for a system operating in a first encoding scheme in a text editor operating in a second encoding scheme includes determining if a change to the document in the second encoding scheme violates one of the field definitions associated with the document and providing an indication to the text editor when a field definition violation is determined. The processing functions include creating, inserting, editing, deleting and formatting. The document processing system can be used when editing RPG documents in a Unicode editor for ultimate processing by a non-Unicode system such as EBCDIC DBCS. The indications can include setting a flag, which can be used by the text editor to drive visual indicators of violations, deny changes and the like.

3 Claims, 8 Drawing Sheets

U.S. PATENT DOCUMENTS

| | | | |
|---|---|---|---|
| 6,204,782 B1 * | 3/2001 | Gonzalez et al. | 341/90 |
| 6,400,287 B1 * | 6/2002 | Ehrman | 341/55 |
| 6,408,302 B1 * | 6/2002 | Lee et al. | 707/102 |
| 6,490,601 B1 * | 12/2002 | Markus et al. | 715/207 |
| 7,028,288 B2 * | 4/2006 | Wall et al. | 717/109 |
| 7,188,115 B2 * | 3/2007 | Farn et al. | 707/100 |
| 7,278,100 B1 * | 10/2007 | Ehrman | 715/264 |
| 2002/0198935 A1 * | 12/2002 | Crandall et al. | 709/203 |

* cited by examiner

US 7,437,667 B2

SYSTEM AND METHOD OF PROCESSING A DOCUMENT TARGETED FOR ONE SYSTEM ON ANOTHER SYSTEM

FIELD OF THE INVENTION

The present invention relates to the field of document processing in text editing systems and more specifically to processing (e.g., creating, inserting, editing, deleting, and formatting) of a document (e.g., an RPG document) in a first system (e.g., Unicode environment) targeted for another system (e.g., non-Unicode).

BACKGROUND

As computer operating environments have evolved, a number of character encoding schemes have been developed to account for varying linguistics requirements. Character encoding schemes such as SBCS (Single-Byte Character Set), DBCS (Double-Byte Character Set) and MBCS (Multi-Byte Character Set) have been widely utilized to support unique character schemes. The range of encoding schemes has resulted in inter-operability issues such as document conversion errors when converting documents to different unique character sets supported by each computer operating environment. In order to address the problems that have resulted from maintaining unique character encoding schemes, the Unicode character encoding was developed as a single character encoding scheme and has become a standard for many current operating environments.

The proliferation of newer computer operating environments based on the Unicode character encoding scheme, and the fact that a large number of computer operating environments and programs still utilize non-Unicode (SBCS, DBCS, MBCS) encoding schemes, has created technical challenges when programs and documents are transferred between different types of computer operating environments.

One such challenge arises when documents from structured programming languages such as RPG (Report Program Generator), DDS (Data Description Specification) and COBOL (Common Business Oriented Language) are converted between Unicode and non-Unicode encoding schemes. The process of document conversion between the encoding schemes, can impact the integrity of field definitions and data contained within the fields, which are executed and utilized by a programming language such as RPG. The field definitions are important to the proper execution of programming languages and the integrity of the data contained within them must be maintained. Similar difficulties arise when a document (e.g., in RPG, DDS, or COBOL) is being actively processed (e.g., creating, inserting, editing, deleting, and formatting) in a first system (e.g., in a Unicode editing system) that is targeted for ultimate processing by a second system (e.g., a non-Unicode environment such as DBCS).

There is a need to provide tools that enable a user, when processing a non-Unicode based document, in a Unicode computer operating environment, the ability to identify/manage problems in document structure and functions.

SUMMARY OF THE INVENTION

The present invention provides a method and system for processing a document on one system (i.e. Unicode) that is targeted to another system (i.e. non-Unicode) by active management to ensure that the formatting structure of the document such as field definitions is still intact after the eventual conversion to the it source/target system (i.e. non-Unicode). This is accomplished in an exemplary embodiment of the present invention by determining if a change to the document violates one of the field definitions associated with the document and providing an indication (e.g., visual indicators in the document, deny or edit blocks, etc.) when a field definition violation is determined.

In accordance with one aspect of the present invention, there is provided a method of processing (e.g., inserting, editing, deleting, formatting) a document having field definitions (e.g., an RPG document) targeted for a non-Unicode system (e.g.,iSeries EBCDIC DBCS) in a Unicode editor, the method comprising: determining if a change to the document (i.e., made in the Unicode editor) violates one of the field definitions associated with the document in the non-Unicode system; and providing an indication (e.g., setting a flag, visual indicators, denying the change, etc.) to the text editor when a field definition violation is determined.

In accordance with another aspect of the present invention, there is provided a system for processing a document having associated field definitions for a target system operating in a first encoding scheme in a text editor in a computing environment operating in a second encoding scheme, the system comprising: a mechanism configured to determine if a change to the document in the second encoding scheme violates one of the field definitions associated with the document in the first encoding scheme; and a mechanism configured to provide an indication to the text editor when a field definition violation is determined. In accordance with yet another aspect of the present invention, there is provided a computer-readable medium having computer-executable instructions for processing a document having associated field definitions targeted for a system operating in a first encoding scheme in a text editor operating in a second encoding scheme comprising: determining if a change to the document in the second encoding scheme violates one of the field definitions associated with the document in the first encoding scheme; and providing an indication to the text editor when a field definition violation is determined.

Other aspects and features of the present invention will become apparent to those ordinarily skilled in the art upon review of the following description of specific embodiments of the invention in conjunction with the accompanying figures.

BRIEF DESCRIPTION OF DRAWINGS

The present invention will be described in conjunction with the drawings in which.

DETAILED DESCRIPTION

Figure 1A:
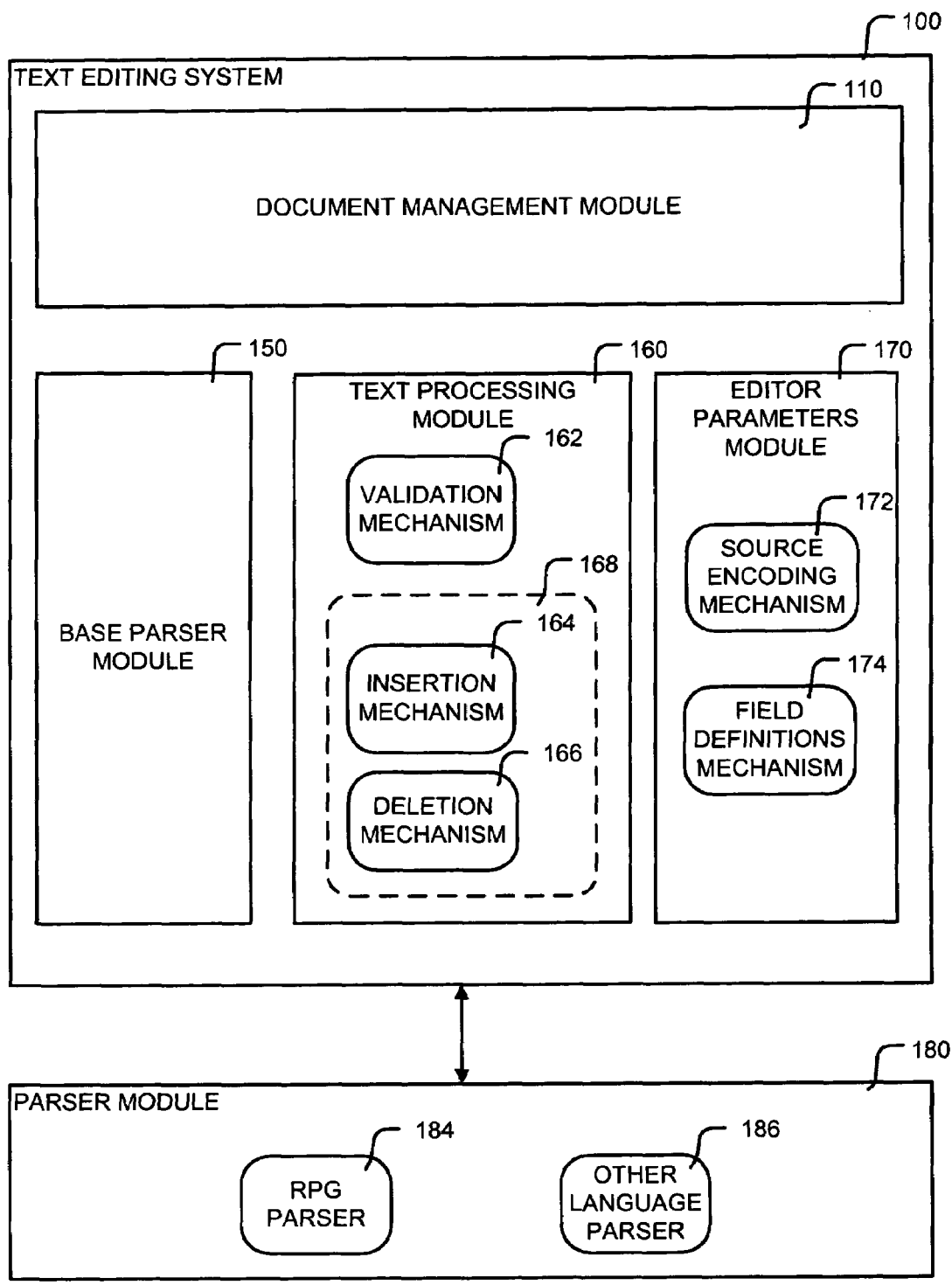
FIG. 1A is a block diagram representation of a text editing system that active processing of a document according to an embodiment of the present invention.

By way of background, the need to support multiple languages in computer operating environments have traditionally been addressed by the development of language specific character sets and encoding schemes such as SBCS, DBCS or MBCS encoding formats as discussed above. For example, the SBCS encoding format can address most Roman based character sets, such as English. However, languages such as Japanese, Korean and Chinese require more than the 255 character positions that are available in SBCS which has resulted in the development of many unique DBCS and MBCS based encoding formats. The need for documents to contain a mix of encoding formats such as SBCS, DBCS, and MBCS has resulted in inter-operability issues when the documents are transferred between computer operating environments based upon different character encoding systems.

To address this issue, the Unicode character encoding format was developed to provide a standardized encoding format consisting of a two-byte representation across computer operating environments. This allows for 65,000 unique symbols to represent individually or in combination, the characters of most commonly used languages. However, there are a number of computer operating environments that use SBCS, DBCS or MBCS (non-Unicode) character encoding formats.

The problem addressed by the present invention arises when documents from a non-Unicode computer operating environment are maintained/processed (also termed active processing) with tools on a Unicode computer operating environment, which are not aware of the underlying formatting structure that must be maintained.

One programming language that utilizes field definitions is RPG. The field definitions provide a predefined formatting structure of the individual lines text. Each field represents a specific operation, data or command that is defined by set byte ranges (i.e. bytes 2 to 10, 11 to 16, 17 to 25). The field definitions that are in effect are determined by text in the lines themselves. Each line may contain different field definitions that must be maintained.

The conversion of a document supporting non-Unicode encoding to Unicode encoding can result in field violations. Field violations are most likely to occur in documents that contain mixed non-Unicode character encoding schemes, such as documents containing both SBCS and DBCS or MBCS. Some DBCS and MBCS character encoding formats require the addition of byte sequences such as Shift-Out (SO) and Shift-In (SI) identifiers and other escape-delimited byte sequences.

For example, the EBCDIC DBCS character encodings use SO and SI identifiers around DBCS character sequences. These sequences denote a transition to and from other character formats such as SBCS that may also be used within the same document. The sequences may add single or multiple bytes impacting the positioning of the text within the field definition. The resulting errors that may occur are not readily apparent to the user and can result in the improper execution of the commands or misrepresentation of the data contained within the document. In addition, during the editing of a document, the user may inadvertently impact the underlying structure when it is converted back to the non-Unicode encoding.

FIG. 1A illustrates a block diagram representation of a text editing system 100 that supports document processing according to an embodiment of the present invention. The functions of the text editing system 100 are defined by various modules discussed in detail below. Each module contains mechanisms that implement various functions for managing processes that are used during various document processing tasks.

The text editing system 100 includes a document management module 110 that provides high-level management (obtaining documents, screen displays, editing windows etc.) of a document being edited, using techniques known to those skilled in the art. The document management module 110 manages individual documents that are opened or newly-created within the text editing system 100. The document management module 110 also controls various aspects of how the document is displayed and viewed and is accessible to other modules in the text editing system 100.

The text editing system 100 further includes a text processing module 160 that handles the loading of documents into the document management module 110 and other text editing operations (such as validation, insertion and deletion). The text editing operations are controlled by respective mechanisms within the text processing module 160. More specifically, validation operations are controlled by a validation mechanism 162, and editing operations by an editing mechanism 168 which includes an insertion mechanism 164 and a deletion mechanism 166. The validation and editing mechanisms (162 and 168) are accessed depending on the specific functions required and editor parameters in effect and will be discussed in more detail below.

The text processing module 160 interacts with a parser module 180. When the document is initially loaded in the system 100, the text processing module 160 calls the parser module 180 to perform a parse of the document. Subsequent changes to the text of the document can also trigger the parser module 180 to perform incremental parsing. In turn, the parser module 180 has full access to the text of the document, and may set parser information and display information (such as syntax coloring) in the document.

The text editing system 100 includes a base parser module 150 which implements a set of generic parser services (e.g., navigation, basic formatting, indentation) and provides an interface component (not shown) to the text editing system 100. The base parser module 150 interacts with the parser module 180, which addresses document specific requirements based upon the target languages such as RPG, DDS, COBOL, etc.

The text editing system 100 also includes an editor parameters module 170 that obtains or establishes various settings of the text edit system 100 by interaction with a user for example through a command line mechanism, and programmatically through an application program interface (API) for the use by components external to the text editing system 100 (such as parsers) using well known techniques.

The editor parameters module 170 includes a source encoding mechanism 172 for determining the source encoding of an originating document, which can be used by the mechanisms (162 and 168) of the text processing module 160. The source encoding mechanism 172 can use a lookup table to determine a mapping of the Unicode text format to a source character encoding such as SBCS, DBCS or MBCS. By determining the source encoding, the addition of commands or sequences such as SO and SI identifiers, as previously discussed, can be accounted for in the text editing functions. The source encoding also provides for calculations of a text string's length in bytes, calculations of byte-sensitive boundaries of DBCS and MBCS characters and character sequences, and correlation between source byte positions and Unicode character positions in the text.

The editor parameters module 170 also includes a field definitions mechanism 174 for determining field definitions within an originating document, which can be used by the mechanisms (162, 168) of the text processing module 160. Determination of what field definitions are in effect for a particular line in an originating document helps to ensure the integrity of the definitions when operations are being performed by the mechanisms (162, 168) within the text processing module 160.

For example, in an RPG document, the sixth column or byte, designates the type of statement represented by that line, be it a Header, File Description, Input, Calculation, Output, etc., statement. The statement type in turn defines the field definitions that are required for that line. The determination of the field definitions assists in determining where field violations occur and can be unique to the target language of the document. The language specific document parser contained in parser module 180, will affect how the field definitions are determined/defined for the document being edited and are directly related to the structural/formatting requirements of the language.

The parser module 180 analyzes the originating document, and marks structural elements in the document at various degrees of detail. Information collected by the parser module 180 is used by the document management module 110 to aid in displaying the document. The parser module 180 allows navigation between structural elements of the document and determines the definition of editing fields for a given text line being edited based on its type. In a programming language source document, each line is an element. An element class definition describes the type of data the element contains. An element may contain more than one element class. The element displayed below includes the code and comment classes. The style of an element determines the way an element will be displayed. The parser 180 sets a string of style characters that is equal in length to the text of the element. The system 100 draws each character of an element text with the attributes of the style character that is in the corresponding position in the element style string. The style of the element displayed below includes keyword, layout blank, punctuation, identifier, operator, quoted string, and comment style characters.

|  | code class | comment class |
|---|---|---|
| Line of C code, element text | if (x == "test") | /*test for x*/ |
| Element style | kk_pi_oo_qqqqqqp_ | cccccccccccc |

The parser module 180 includes a number of document parsers: an RPG parser 184 for handling RPG documents and parsers for other languages 186 for handling other types of documents such as C++ programming language source and the like. The various document parsers (184, 186) in the parser module 180 are attached by a document-type association. For example, the RPG parser 184 is activated when an RPG document (*.RPG, *.OPMRPG, etc.) is loaded or created in the text editor 100. The document parsers (184, 186) provide an initial parse of the document and are used following any changes that are made to the document.

Figure 1B:
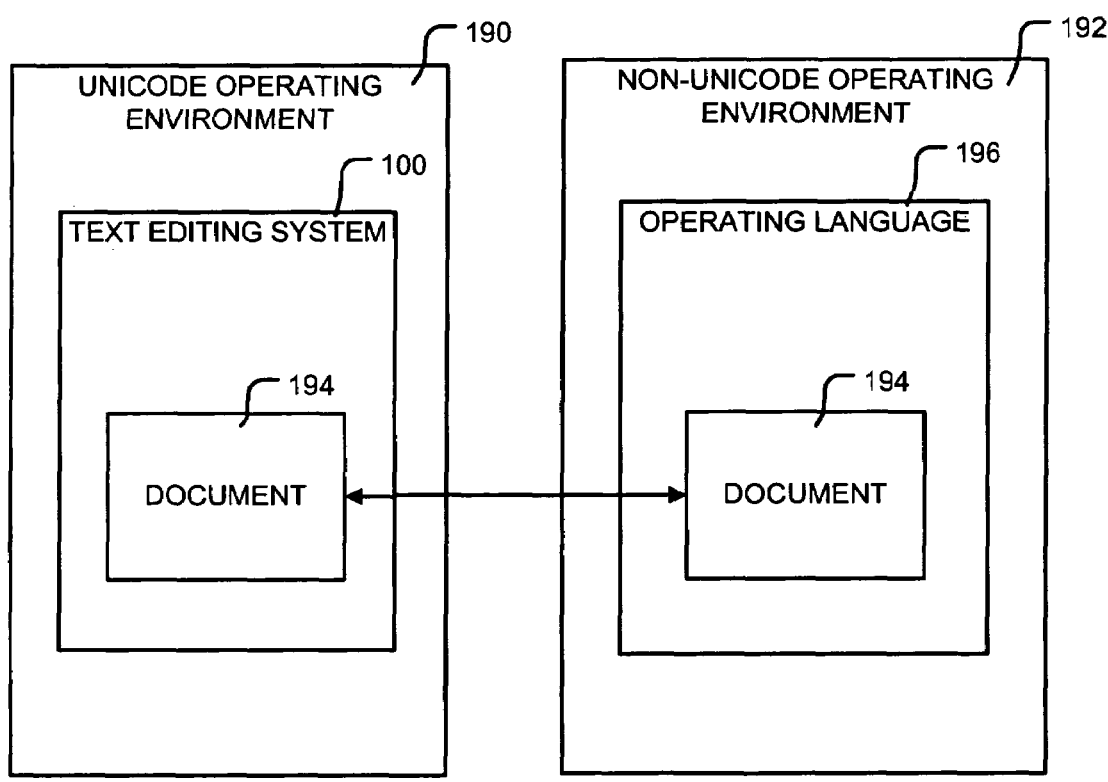
FIG. 1B is a block diagram representation illustrating an example document processing arrangement involving a Unicode operating environment and a non-Unicode operating environment.

FIG. 1B illustrates an example arrangement of environments supporting active processing of a document 194 according to the present invention. In the arrangement of FIG. 1B, a document (e.g., an RPG formatted document) is being processed in the text editing system 100 functioning in a Unicode operating environment 190. The target environment for the document 194 is, however, an operating language 196 residing in a non-Unicode operating environment 192 (e.g., EBCDIC DBCS).

Document Parser

Figure 2:
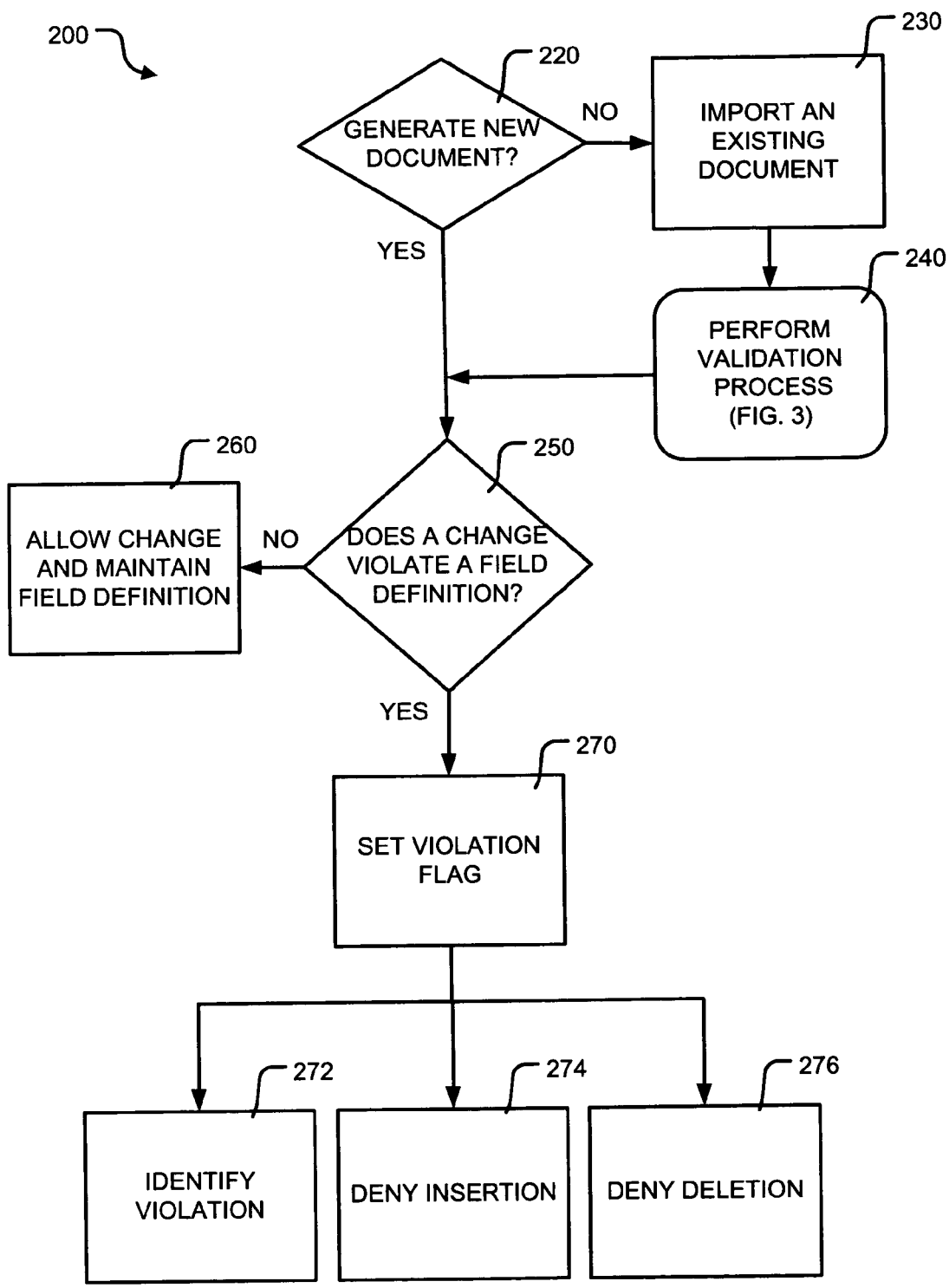
FIG. 2 is a flow chart of a parser process according to an embodiment of the present invention.

FIG. 2 illustrates a flow chart of a parser process 200 according to an embodiment of the present invention. The parser process 200, is implemented for example as part of the RPG parser 184 or other language specific parsers 186.

The process 200 commences by determining if the parser (184 or 186) has been activated by the generation of a new document (YES at step 220) or the importing of an existing document (NO at step 220). If a RPG document is imported at 230, the validation process 300 (refer to FIG. 3) is performed. Once the editing process has commenced on a newly created or imported document, editing functions are actively monitored to determine if a change in the document has occurred.

The parser process 200 determines at step 250 if a change (eg. insertion, deletion, edit, or re-format) will cause a violation in a field definition. If the change does not result in a field violation (NO at step 250), the change is allowed to occur 260 while maintaining the field boundaries/definitions by adding or deleting spaces as detailed subsequently in conjunction with FIGS. 4 and 5. If a field violation would occur as a result of the change (YES at step 250), a violation flag can be set at step 270. The violation flag is an indicator that initiates an appropriate function that is to occur next depending on a mode of operation of the text editing system 100.

More specifically, the violation can be identified at step 272 to the user through a user interface of the text editing system 100, allowing the user to see the impact of the change on the document as detailed in the validation process 300. If the change is the result of an insertion, the insertion may be denied 274 (refer to FIG. 4 for details). Finally, if the change is the result of a deletion then the deletion may be denied at step 276 (refer to FIG. 5 for details).

Figure 4:
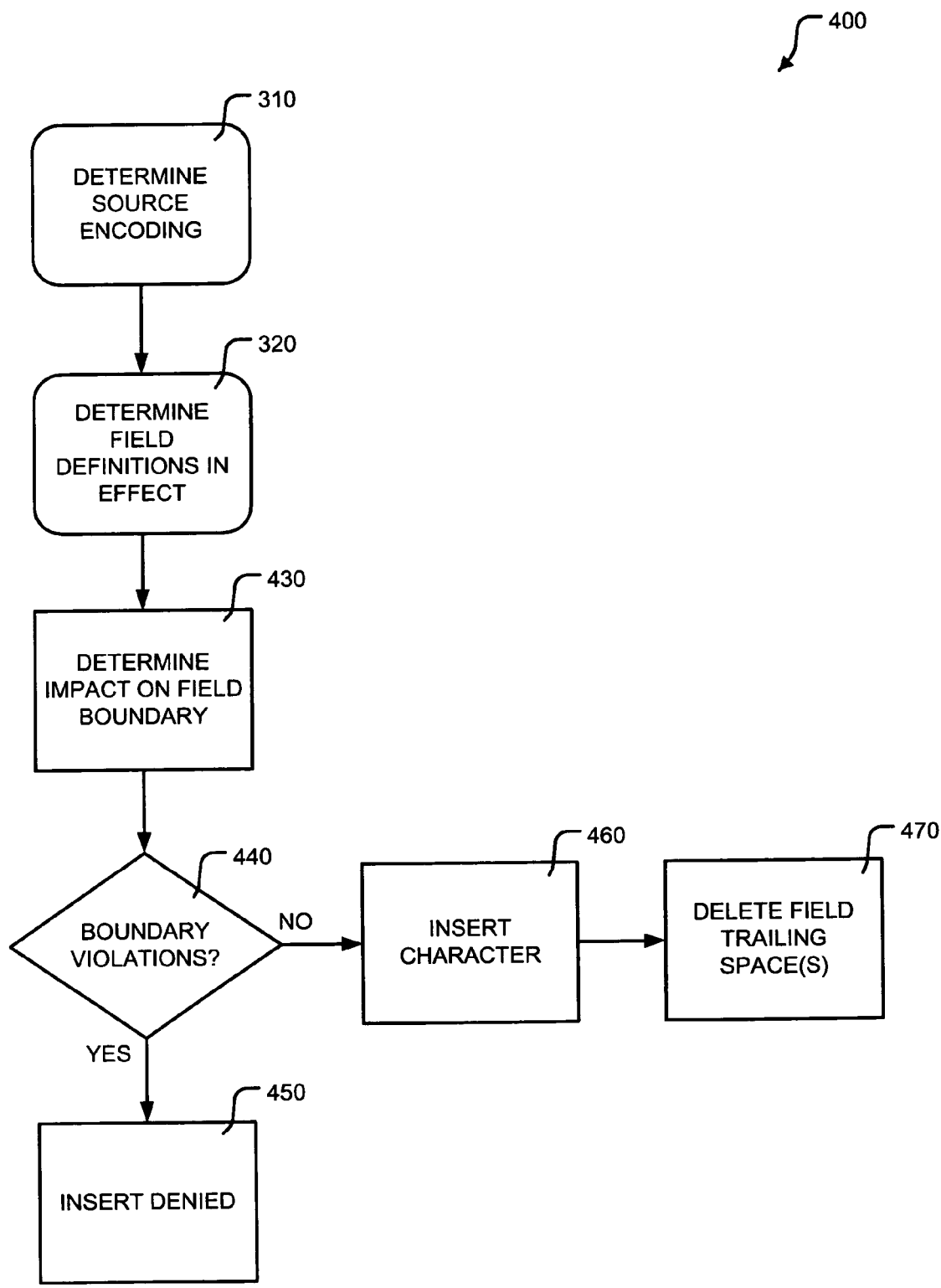
FIG. 4 is a flow chart of the insertion process, as part of the process of FIG. 2, according to an embodiment of the present invention.
Figure 5:
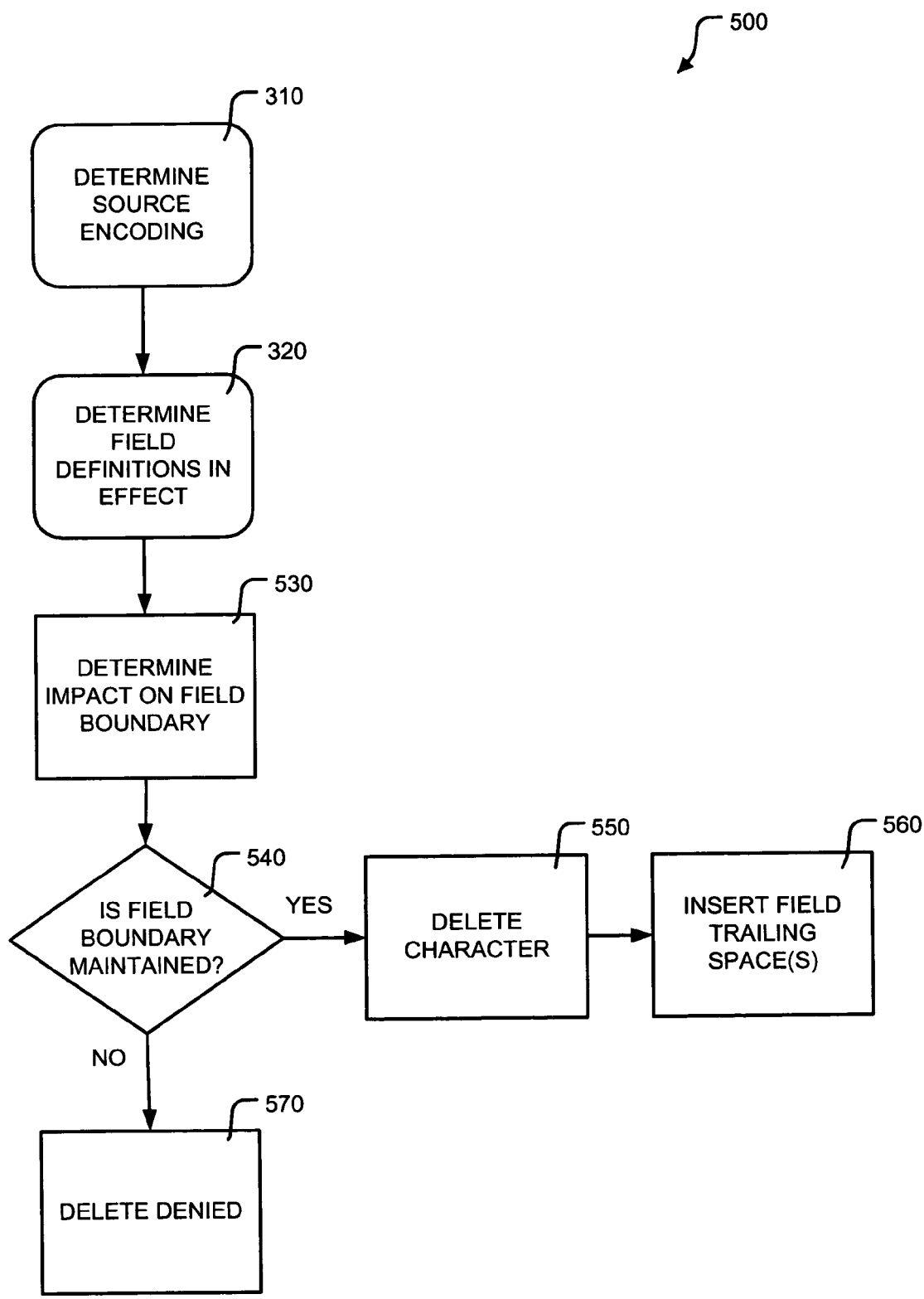
FIG. 5 is a flow chart of the deletion process, as part of the process of FIG. 2, according to an embodiment of the present invention.

As described above in conjunction with FIG. 2, the present invention implements a series of processes: the validation process 300 (shown in FIG. 3), the insertion process 400 (shown in FIG. 4) and the deletion process 500 (shown in FIG. 5). These processes are implemented through the corresponding mechanisms (162, 164, 166) of the text processing module 160 in the text editing system 100. Details of these processes (300, 400, and 500) will be described in conjunction with a practical example illustrated with various tables provided below.

Table 1 shows a representation of the conversion from text characters to Unicode, SBCS and DBCS formats and a byte representation that is used in the discussion of the examples.

TABLE 1

| Roman Characters | Non-Roman Character | Unicode Byte Format | SBCS Byte Format | DBCS Byte Format | DBCS with SO/SI |
|---|---|---|---|---|---|
| a |  | $a_1 a_2$ | $a_1$ | — | — |
| b |  | $b_1 b_2$ | $b_1$ | — | — |
| c |  | $c_1 c_2$ | $c_1$ | — | — |
|  | D | $D_1 D_2$ | — | $D_1 D_2$ | $>D_1 D_2<$ |
|  | E | $E_1 E_2$ | — | $E_1 E_2$ | $>E_1 E_2<$ |
|  | F | $F_1 F_2$ | — | $F_1 F_2$ | $>F_1 F_2<$ |
| x |  | $x_1 x_2$ | $x_1$ | — | — |
| y |  | $y_1 y_2$ | $y_1$ | — | — |

The non-Roman characters used in Japanese or Chinese is represented by upper case letters such as "D" in the following examples and consists of a two-byte sequence such as $D_1D_2$. If a transition to or from SBCS to DBCS characters occurs, the addition of escape-delimited byte sequences such as SO and SI identifiers is required for EDCDIC DBCS character encodings The SO and SI identifiers are shown by ">" and "<" in these examples and require a single byte each. The following examples use the DBCS character format; however, the same approach can be used to account for MBCS character formats that may use multi-byte escape sequences. All the characters in the Unicode encoding are represented by two bytes.

Validation

Figure 3:
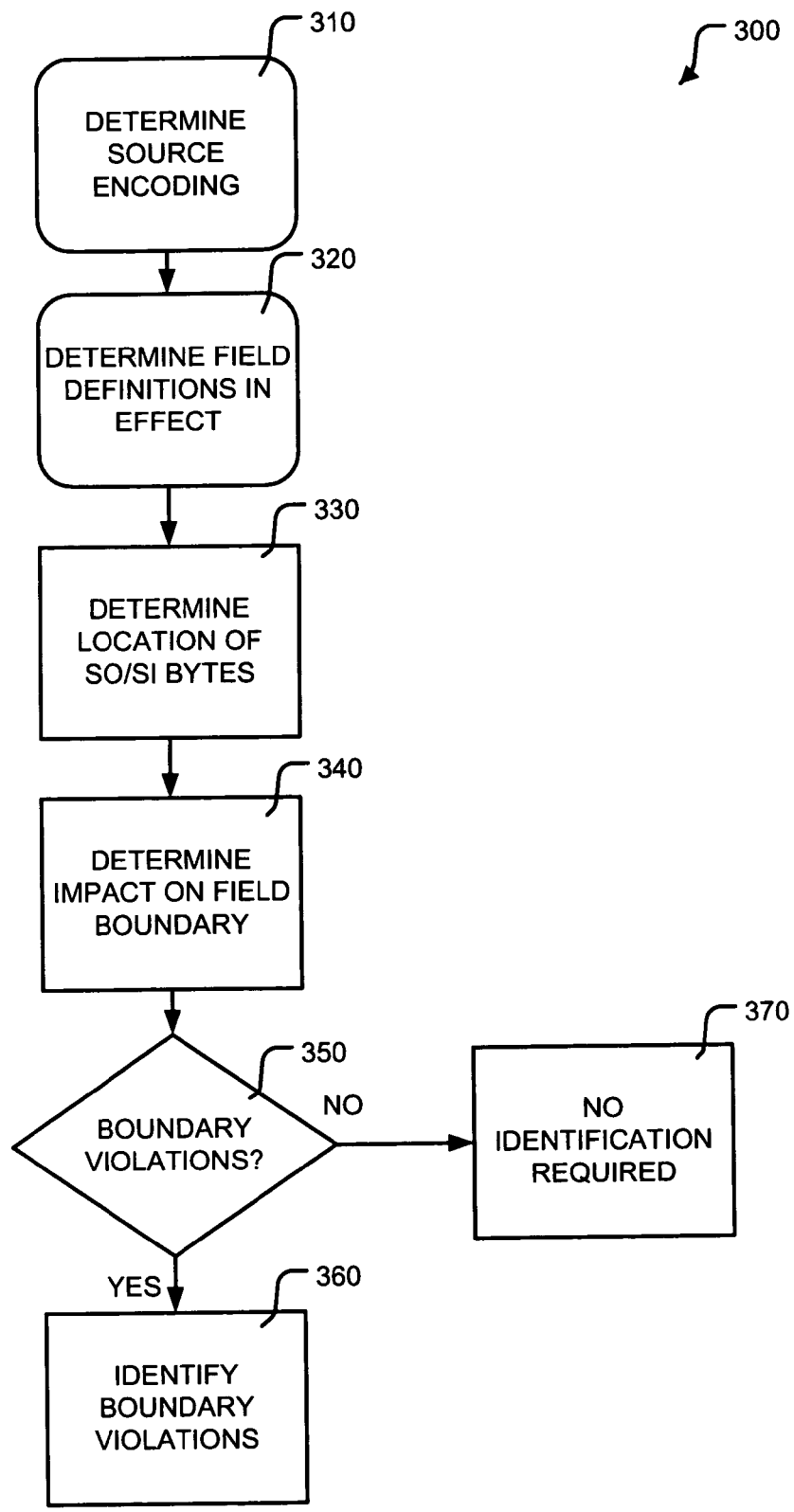
FIG. 3 is a flow chart of the validation process, as part of the process of FIG. 2, according to an embodiment of the present invention.

The validation process 300, as shown in FIG. 3, is performed to ensure that no field boundary divides the bytes of a DBCS or MBCS character, to ensure that no field boundary splits a DBCS or MBCS character sequence including its delimiting SO and SI or other multi-byte escape byte sequences, and to identify these violations (to a user for example). Identifying these errors and enabling them to be corrected can save time and effort in converting and debugging the document.

When the validation process 300, is executed, the encoding (i.e., the type of encoding) of a source file (i.e., a document) is determined at step 310 by the source encoding mechanism 172; and the field definitions that are in effect for the document or particular line of text are determined at step 320 by the field definitions mechanism 174 in conjunction with the document parser 180. The location of any SO and SI bytes (or identifiers), if applicable to the source encoding in effect, are determined at step 330. The impact of the DBCS and MBCS byte sequences in the source encoding on field boundaries is determined at step 340. If it is determined that there are field boundary violations (YES at step 350), then the violations are identified (e.g., to a user) through the document management module 110, at step 360. If there are no boundary violations (NO at step 350) then no identification is required at step 370. The identification of field violation boundaries could result in the highlighting of the affected character or string, or a text message listing the exact position of the error, or both.

Validation Example

In Table 2 and Table 3, the editing in Unicode of a line of text in a document originating or targeted for a non-Unicode (mixed SBCS and EBCDIC DBCS) system is shown. One field is defined in this example from Byte 4 to 11; however, it is possible to have multiple field definitions in the same line. When the line is converted to Unicode, the corresponding field definition is defined by Unicode character positions 7 to 14.

TABLE 2

| | Non-Unicode Displayed Text | | | | | | | | | | | |
|---|---|---|---|---|---|---|---|---|---|---|---|---|
| | a | b | c | D | | E | | | | | | x |
| Field Definition | | | | X | X | X | X | X | X | X | X | |
| Byte Position | 1 | 2 | 3 | 4 | 5 | 6 | 7 | 8 | 9 | 10 | 11 | 12 |
| SBCS/DBCS Byte Representation | $a_1$ | $b_1$ | $c_1$ | > | $D_1$ | $D_2$ | $E_1$ | $E_2$ | < | | | $x_1$ |

A representation of the line when converted to a Unicode environment is shown in Table 3.

TABLE 3

| | Unicode Displayed Text | | | | | | | | | | | | | | | |
|---|---|---|---|---|---|---|---|---|---|---|---|---|---|---|---|---|
| | a | | b | | c | | D | | E | | | | | | x | |
| | Character Position | | | | | | | | | | | | | | | |
| | 1 | | 2 | | 3 | | 4 | | 5 | | 6 | | 7 | | 8 | |
| Field Definition | | | | | | | X | X | X | X | X | X | X | X | | |
| Byte Position | 1 | 2 | 3 | 4 | 5 | 6 | 7 | 8 | 9 | 10 | 11 | 12 | 13 | 14 | 15 | 16 |
| Unicode Bytes Representation | $a_1$ | $a_2$ | $b_1$ | $b_2$ | $c_1$ | $c_2$ | $D_1$ | $D_2$ | $E_1$ | $E_2$ | | | | | $x_1$ | $x_2$ |

In this example, the field definitions remain intact during the conversion and there are no field violations.

In Table 4, a DBCS character sequence, bounded by the SO and SI character identifiers, crosses the start of the field definition at byte 3. The "●" indicates the byte position at which the field violation occurs.

TABLE 4

| | Non-Unicode Displayed Text | | | | | | | | | | | |
|---|---|---|---|---|---|---|---|---|---|---|---|---|
| | a | b | | D | | E | | F | | | | x |
| Field Definition | | | ● | X | X | X | X | X | X | X | X | |
| Byte Position | 1 | 2 | 3 | 4 | 5 | 6 | 7 | 8 | 9 | 10 | 11 | 12 |
| SBCS/DBCS Byte Representation | $a_1$ | $b_1$ | > | $D_1$ | $D_2$ | $E_1$ | $E_2$ | $F_1$ | $F_2$ | < | | $x_1$ |

When the text is converted to Unicode as in Table 5, byte positions 5 and 6 now contain the bytes of the non-Roman character D. Since the SO identifier is not present in the text converted to the Unicode encoding, it must be determined by the validation process 300 that the identifier sequence would cross the boundary when converted back to the non-Unicode or source encoding. The violation can be identified to a user by, for example, highlighting the character or the position of the character where the violation occurs.

TABLE 5

| | Unicode Displayed Text | | | | | | | | | | | | | | | |
|---|---|---|---|---|---|---|---|---|---|---|---|---|---|---|---|---|
| | a | | b | | D | | E | | F | | | | x | | | |
| | | | | | | | Character Position | | | | | | | | | |
| | 1 | | 2 | | 3 | | 4 | | 5 | | 6 | | 7 | | 8 | |
| Field Definition | | | | | | • | • | X | X | X | X | X | X | X | | |
| Byte Position | 1 | 2 | 3 | 4 | 5 | 6 | 7 | 8 | 9 | 10 | 11 | 12 | 13 | 14 | 15 | 16 |
| Unicode Byte Representation | $a_1$ | $a_2$ | $b_1$ | $b_2$ | $D_1$ | $D_2$ | $E_1$ | $E_2$ | $F_1$ | $F_2$ | | | $x_1$ | $x_2$ | | |

By providing an immediate indication to a user that a field violation exists at Unicode character position 3, action can be taken to correct the problem early in the process, preventing encoding conversion errors, which will be more difficult to identify and correct.

Insertion

The insert process 400, as shown in FIG. 4, is performed to ensure that while the document is being edited, the user does not insert text that will cause a field violation in the originating source non-Unicode document. By not allowing field boundaries to be divided by the bytes of DBCS or MBCS characters or by SI or SO identifiers or other escape-delimited byte sequences, the integrity of the field definition is maintained. In general, if during an insertion a user does not cause a violation, the insertion is allowed to proceed, otherwise it is denied.

When the insertion process 400 is executed, for example by a user attempting to insert a character, the encoding of the source file is determined at step 310 by the source encoding mechanism 172. The field definitions that are in effect for the particular line of text are identified at step 320 by the field definitions mechanism 174 in conjunction with the document parser 180. The fields being defined in terms of source encoding bytes, the corresponding field for the current insertion point is determined inside the Unicode encoding processing environment for the current text line. The impact of the insertion on field boundaries is determined at step 430 and boundary violation results are assessed at step 440.

If the insertion does not result in a violation of the boundary by the DBCS or MBCS byte sequence or SO or SI identifiers (NO at step 440), the insertion is allowed to occur at step 460; otherwise (YES at step 440) the insertion is denied at step 450. When the insertion is allowed, the appropriate number of trailing spaces are deleted from the end of the field at step 470, in order to maintain the integrity of this field, and that of the rest of the text on this line (including possibly other fields). The number of the deleted space characters depends on the effective increase in the source-encoding byte length resulting from the insertion.

INSERTION EXAMPLE

When the line of text in Table 2 is edited in the Unicode environment, if the user attempts to insert "a" at Unicode character position 5, the insertion does not appear to violate the defined field, as shown in the Unicode text of Table 6.

TABLE 6

| | Unicode Displayed Text | | | | | | | | | | | | | | | |
|---|---|---|---|---|---|---|---|---|---|---|---|---|---|---|---|---|
| | a | | b | | c | | D | | a | | E | | | | x | |
| | | | | | | | Character Position | | | | | | | | | |
| | 1 | | 2 | | 3 | | 4 | | 5 | | 6 | | 7 | | 8 | |
| Field Definition | | | | | | | X | X | X | X | X | X | X | X | | |
| Byte Position | 1 | 2 | 3 | 4 | 5 | 6 | 7 | 8 | 9 | 10 | 11 | 12 | 13 | 14 | 15 | 16 |
| Unicode Byte Representation | $a_1$ | $a_2$ | $b_1$ | $b_2$ | $c_1$ | $c_2$ | $D_1$ | $D_2$ | $a_1$ | $a_2$ | $E_1$ | $E_2$ | | | $x_1$ | $x_2$ |

However, when the conversion to the source encoding is performed the insertion will cause a field overflow at byte position 12 as shown in Table 7. The addition of the SO and SI identifiers to the surrounding DBCS sequences cause the violation. By not allowing the insertion of the "a", the field integrity is maintained.

TABLE 7

| | Non-Unicode Displayed Text | | | | | | | | | | | | |
|---|---|---|---|---|---|---|---|---|---|---|---|---|---|
| | a | b | c | D | | a | | E | | | x | | |
| Field Definition | | | | X | X | X | X | X | X | X | X | • | |
| Byte Position | 1 | 2 | 3 | 4 | 5 | 6 | 7 | 8 | 9 | 10 | 11 | 12 | 13 |
| SBCS/ DBCS Byte Representation | $a_1$ | $b_1$ | $c_1$ | > | $D_1$ | $D_2$ | < | $a_1$ | > | $E_1$ | $E_2$ | < | $x_1$ |

However, if a DBCS character "F" was inserted instead as shown in Unicode text in Table 8, a violation does not occur.

TABLE 8

| | Unicode Displayed Text | | | | | | | |
|---|---|---|---|---|---|---|---|---|
| | a | b | c | D | E | F | | x |
| | | | | Character Position | | | | |
| | 1 | 2 | 3 | 4 | 5 | 6 | 7 | 8 |
| Field Definition | | | | X X | X X | X X | X X | |
| Byte Position | 1 2 | 3 4 | 5 6 | 7 8 | 9 10 | 11 12 | 13 14 | 15 16 |
| Unicode Byte Representation | $a_1$ $a_2$ | $b_1$ $b_2$ | $c_1$ $c_2$ | $D_1$ $D_2$ | $E_1$ $E_2$ | $F_1$ $F_2$ | | $x_1$ $x_2$ |

Since the inclusion of the "F" (non-Roman character) does not cause the need of additional SO and SI identifiers, requiring more byte positions, the SO identifiers at byte 11 does not violate the field boundary and the field definition is maintained and the insertion is allowed to proceed as shown in Table 9. In order to maintain the field definitions, the additional trailing spaces are deleted thus ensuring that the position on "x" at byte 12 is not affected.

TABLE 9

| | Non-Unicode Displayed Text | | | | | | |
|---|---|---|---|---|---|---|---|
| | a | b | c | D | F | E | x |
| Field Definition | | | | X X X | X X X | X X | |
| Byte Position | 1 | 2 | 3 | 4 5 6 | 7 8 9 | 10 11 | 12 |
| SBCS/DBCS Byte Representation | $a_1$ | $b_1$ | $c_1$ | > $D_1$ $D_2$ | $F_1$ $F_2$ | $E_1$ $E_2$ < | $x_1$ |

Deletion

The deletion process 500, as show in FIG. 5, is performed to maintain the field definition of the current field by determining the effect on the source encoding when the selected characters are deleted. The field definitions are maintained by adjusting the field size to compensate for the deletion by padding the field with spaces.

When the deletion process 500, is executed, the encoding of the source file is determined at step 310 by the source encoding mechanism 172; and the field definitions that are in effect for the document or particular line of text are determined at step 320 by the field definitions mechanism 174 in conjunction with the document parser 180. The fields being defined in terms of source encoding bytes, the corresponding field for the current deletion point is determined inside the Unicode encoding processing environment for the current text line.

If a violation would occur, the deletion is denied at step 570. Otherwise, the character is deleted at step 550, and the necessary padding is performed at step 560. The padding step 560 involves adding an appropriate number of trailing spaces to the end of the field, in order to maintain the integrity of this field, and that of the rest of the text on this line (including possibly other fields). The number of the added space characters depends on the effective decrease in the source-encoding byte length resulting from the deletion.

Deletion Example

In the following example, the user wishes to remove the non-Roman character 'E' starting at Unicode character position 5 as shown in Table 10 which corresponds to byte position 7 in the non-Unicode text of Table 11.

TABLE 10

| | Unicode Displayed Text | | | | | | | |
|---|---|---|---|---|---|---|---|---|
| | a | b | c | D | E | | | x |
| | | | | Character Position | | | | |
| | 1 | 2 | 3 | 4 | 5 | 6 | 7 | 8 |
| Field Definition | | | | X X | X X | X X | X X | |
| Byte Position | 1 2 | 3 4 | 5 6 | 7 8 | 9 10 | 11 12 | 13 14 | 15 16 |
| Unicode Byte Representation | $a_1$ $a_2$ | $b_1$ $b_2$ | $c_1$ $c_2$ | $D_1$ $D_2$ | $E_1$ $E_2$ | | | $x_1$ $x_2$ |

TABLE 11

| | Non-Unicode Displayed Text | | | | | | |
|---|---|---|---|---|---|---|---|
| | a | b | c | D | | E | x |
| Field Definition | | | | X X X | X X | X X | |
| Byte Position | 1 | 2 | 3 | 4 5 6 | 7 8 | 9 10 11 | 12 |
| SBCS/DBCS Byte Representation | $a_1$ | $b_1$ | $c_1$ | > $D_1$ $D_2$ | $E_1$ $E_2$ | < | $x_1$ |

The result of the character deletion is shown in the Unicode text in Table 12. Note that the character 'x' now falls within the field definition at character position 7.

TABLE 12

| | Unicode Displayed Text | | | | | | | | | | | | | | | |
|---|---|---|---|---|---|---|---|---|---|---|---|---|---|---|---|---|
| | a | | b | | c | | D | | | | | | x | | y | |
| | Character Position | | | | | | | | | | | | | | | |
| | 1 | | 2 | | 3 | | 4 | | 5 | | 6 | | 7 | | 8 | |
| Field Definition | | | | | | | X | X | X | X | X | X | X | X | | |
| Byte Position | 1 | 2 | 3 | 4 | 5 | 6 | 7 | 8 | 9 | 10 | 11 | 12 | 13 | 14 | 15 | 16 |
| Unicode Byte Representation | $a_1$ | $a_2$ | $b_1$ | $b_2$ | $c_1$ | $c_2$ | $D_1$ | $D_2$ | | | | | $x_1$ | $x_2$ | $y_1$ | $y_2$ |

Moreover, when the text is converted to the base encoding, the characters 'x' and 'y' will fall within the field definition as shown in Table 13.

TABLE 13

| | Non-Unicode Displayed Text | | | | | | | | | | |
|---|---|---|---|---|---|---|---|---|---|---|---|
| | a | b | c | | D | | | | | x | y |
| Field Definition | | | | X | X | X | X | X | X | X | X |
| Byte Position | 1 | 2 | 3 | 4 | 5 | 6 | 7 | 8 | 9 | 10 | 11 |
| SBCS/DBCS Byte Representation | $a_1$ | $b_1$ | $c_1$ | > | $D_1$ | $D_1$ | < | | | $x_1$ | $y_1$ |

In order to maintain field integrity, two additional spaces are added to maintain the position of the characters that were originally outside of the field definition as shown in Table 14 and Table 15.

TABLE 14

| | Unicode Displayed Text | | | | | | | | | | | | | | | | | |
|---|---|---|---|---|---|---|---|---|---|---|---|---|---|---|---|---|---|---|---|
| | a | | b | | c | | D | | | | | | | | | | $x_1$ | |
| | Character Position | | | | | | | | | | | | | | | | | |
| | 1 | | 2 | | 3 | | 4 | | 5 | | 6 | | 7 | | 8 | | 9 | |
| Field Definition | | | | | | | X | X | X | X | X | X | X | X | X | X | | |
| Byte Position | 1 | 2 | 3 | 4 | 5 | 6 | 7 | 8 | 9 | 10 | 11 | 12 | 13 | 14 | 15 | 16 | 17 | 18 |
| Unicode Byte Representation | $a_1$ | $a_2$ | $b_1$ | $b_2$ | $c_1$ | $c_2$ | $D_1$ | $D_2$ | | | | | | | | | $x_1$ | $x_2$ |

TABLE 15

| | Non-Unicode Displayed Text | | | | | | | | | | | |
|---|---|---|---|---|---|---|---|---|---|---|---|---|
| | a | b | c | | D | | | | | | | x |
| Field Definition | | | | X | X | X | X | X | X | X | X | |
| Byte Position | 1 | 2 | 3 | 4 | 5 | 6 | 7 | 8 | 9 | 10 | 11 | 12 |
| SBCS/DBCS Byte Representation | $a_1$ | $b_1$ | $c_1$ | > | $D_1$ | $D_2$ | < | | | | | $x_1$ |

In summary, according to an exemplary embodiment of the present invention, by combining validation, insertion, and deletion mechanisms (162, 164, 166), in an process that actively monitors the functions of the text editing system 100, a user can ensure that the structure and formatting of a text document will be maintained when it is converted back to the source SBCS, DBCS and MBCS encoding.

Figure 6A:
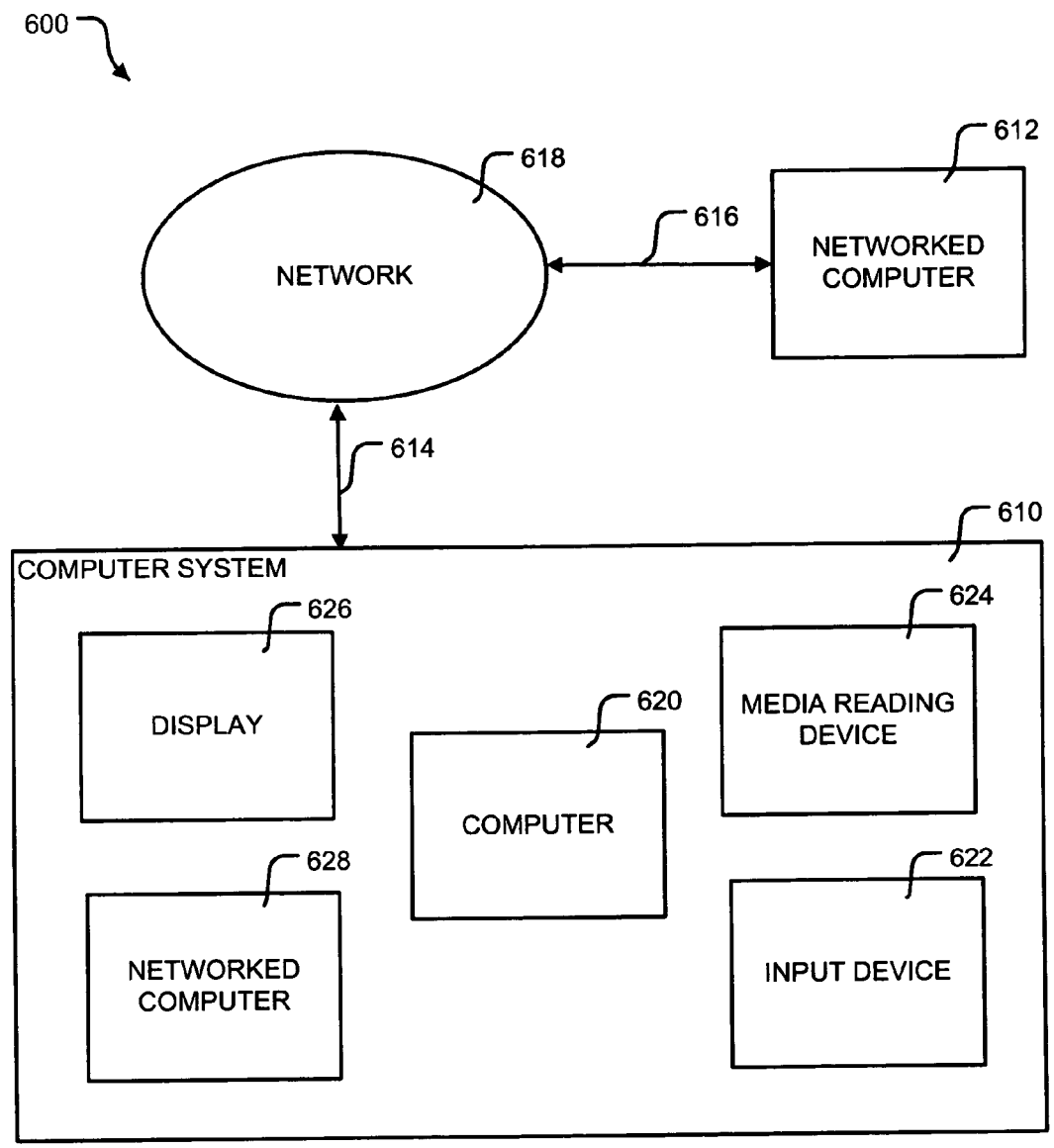
FIGS. 6A and 6B are simplified block diagram representations of an exemplary computing environment suitable for implementing document processing according to the present invention.

FIG. 6A is a block diagram representation of a computing environment 600 in which the various embodiments of the present invention operate. The computing environment 600 includes a computer system 610 operationally coupled to a networked computer 612 through suitable network connections 614 and 616 and a network 618. The network 618 can be any conventional network such as a local area network, wide area network, intranets, the Internet, and the like, or a convenient combination thereof. The network 618 provides a mechanism for transporting data, such as documents/data/instructions, to the computer system 610. It will be appreciated that in alternative embodiments, the computer system 610 may not be connected to the network and documents/data/instructions will be provided directly to a computer 620 through an input device (e.g., keyboard, mouse) 622 or through a permanent or removable computer readable medium device 624 (e.g., hard disk, floppy disc, CD-ROM). Further, aspects of the present invention can be distributed amongst various networked computers interacting with the computer system 600 through the network 618 (and possibly a combination of networks).

The computer system 610 includes the computer 620 that communicates with various output devices such as a display terminal 626 and a printer 628, with the network 518, and with various input devices 622 and media reading devices 624 as discussed above. Other devices can include various computer peripheral devices (not shown) such as a scanner, tablets, and the like.

Figure 6B:
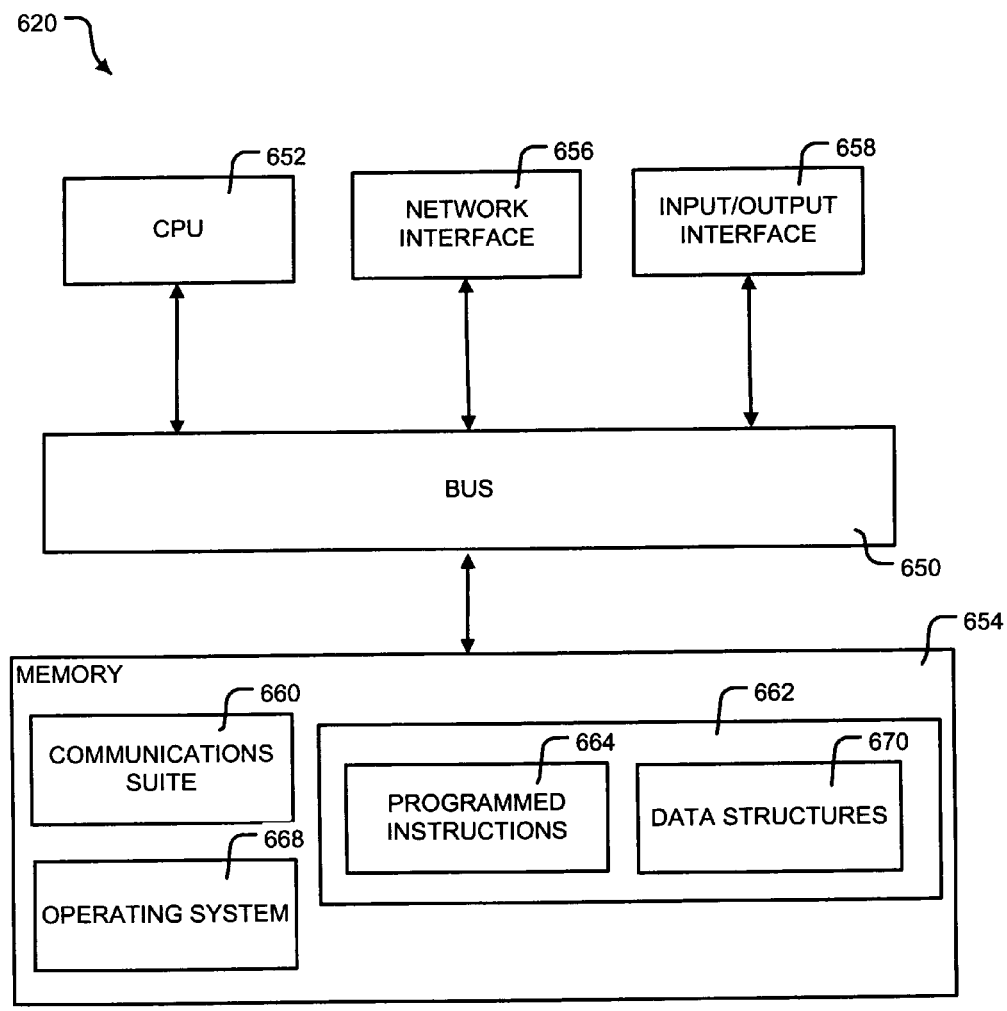

FIG. 6B illustrates a block diagram representation of the computer 620 shown in FIG. 6A. The computer 620 includes a bus 650 that operationally interconnects various subsystems or components of the computer 620, such as a central processing unit (CPU) 652, a memory 654, a network interface 656, and an input/output interface 658.

The CPU 652 can be a commercially available CPU or a customized CPU suitable for operations described herein. Other variations of CPU 652 can include a plurality of CPUs interconnected to coordinate various operational functions.

The input/output interfaces 658 to enable communication between various subsystems of the computer 620 and various input/output devices shown in FIG. 6A. The input/output interface 658 includes a video card for operational interfacing with the display terminal 626, and preferably a disk drive unit or CD/DVD-ROM drive unit for reading suitable removable computer-readable medium, such as a floppy disk, or a CD. The removable medium provides programming instructions for subsequent execution by the CPU 652 to configure and enable the computer 620 to achieve the functions of the present invention.

The network interface 656, in combination with a communication suite 660, enables suitable communication between the computer 620 and other computers operationally connected through the network 618 as shown in FIG. 6A. Examples of conventional network interfaces 656 include an Ethernet card, a token ring card, a modem and the like. Optionally, the network interface 656 may also enable retrieval of transmitted programming instructions or data to configure and enable the computer 620 to achieve the functions of the present invention. Further, aspects of the present invention can be enabled in various computer systems operationally networked to form a distributed computing environment to achieve the functions of the present invention.

The memory 654 includes both volatile and persistent memory for storage of components 662 (including programmed instructions 664 and data structures 670 such as databases and lookup tables) that may be required by the embodiments of the present invention. An operating system 668 co-operates with the CPU 652 to enable various operational interfacing with various subsystems of the computer 620, and for providing various functionality, such as multi-tasking and the like.

The invention claimed is:

1. A method of processing a document having associated field definitions targeted for a system operating in a non-Unicode encoding scheme in a text editor operating in a Unicode encoding scheme, the method comprising;

responsive to importing a document in a non-Unicode encoding scheme into a text editor operating in a Unicode encoding scheme, determining, by a source encoding mechanism in an editor parameters module of the text editor, a source encoding of the originating document;

determining, by a field definitions mechanism in an editor parameters module of the text editor, one or more field definitions that are in effect for a given line in the document in the Unicode encoding scheme, wherein the field definitions provide a predefined formatting structure of the individual lines of text in the document;

determining one or more shift-out or shift-in bytes in the document;

determining, by a validation process of the text editor, whether one or more field violations exist in the document as a result of importing the document in the non-Unicode encoding scheme into the text editor in the Unicode encoding scheme;

responsive to a determination that importing the document into the text editor results in one or more field violations, providing an identification of the one or more field violations through a document management module of the text editor;

determining, by a parser process, if a change to the document in the Unicode encoding scheme violates one of the one or more field definitions within the document in the non-Unicode encoding scheme;

responsive to a determination that the change violates one of the field definitions associated with the document in the non-Unicode encoding scheme, providing an indication to the text editor when a field definition violation is determined and denying the change to the document;

responsive to a determination that the change does not violate one of the field definitions associated with the document in the non-Unicode encoding scheme, allowing the change to the document;

maintaining field definitions of the document as a result of the change, wherein maintaining field definitions of the document comprises deleting spaces in a field in the document when the change is an insert and wherein maintaining field definitions of the document comprises inserting spaces in the document when the change is a deletion.

2. The method of claim 1, further comprising identifying the field definition violation in the document in response to the indication.

3. The method of claim 2, wherein the step of identifying includes generating a display indication for use by the text editor at a location in the document representative of the field definition violation.

* * * * *